(12) United States Patent
Ekberg

(10) Patent No.: US 7,693,797 B2
(45) Date of Patent: Apr. 6, 2010

(54) TRANSACTION AND PAYMENT SYSTEM SECURITY REMOTE AUTHENTICATION/VALIDATION OF TRANSACTIONS FROM A TRANSACTION PROVIDER

(75) Inventor: Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1215 days.

(21) Appl. No.: 10/871,051

(22) Filed: Jun. 21, 2004

(65) Prior Publication Data

US 2005/0283444 A1    Dec. 22, 2005

(51) Int. Cl.
G07F 7/00 (2006.01)
G07F 7/02 (2006.01)
G07B 15/00 (2006.01)
(52) U.S. Cl. .............................. 705/67; 705/64; 705/65
(58) Field of Classification Search ................ 705/1, 705/64–65, 67, 75–79
See application file for complete search history.

(56) References Cited

U.S. PATENT DOCUMENTS

| 5,491,752 | A * | 2/1996 | Kaufman et al. ............... 380/30 |
| 5,703,793 | A * | 12/1997 | Wise et al. ................... 382/232 |
| 5,887,266 | A |  3/1999 | Heinonen et al. ........... 455/558 |
| 6,386,451 | B1 |  5/2002 | Sehr ........................... 235/384 |
| 6,615,262 | B2 |  9/2003 | Schweitzer et al. ......... 709/224 |
| 6,665,531 | B1 | 12/2003 | Soderbacka et al. ......... 455/412 |
| 6,941,461 | B2 * |  9/2005 | Carro et al. ................. 713/181 |
| 2001/0042206 | A1 * | 11/2001 | Carro et al. ................. 713/176 |
| 2002/0161826 | A1 * | 10/2002 | Arteaga et al. .............. 709/203 |
| 2002/0165830 | A1 * | 11/2002 | Kremer ........................ 705/75 |
| 2003/0028484 | A1 * |  2/2003 | Boylan et al. ................ 705/40 |
| 2003/0055735 | A1 * |  3/2003 | Cameron et al. ............. 705/26 |
| 2003/0093667 | A1 * |  5/2003 | Dutta et al. ................. 713/161 |
| 2003/0187787 | A1 * | 10/2003 | Freund ........................ 705/39 |

(Continued)

FOREIGN PATENT DOCUMENTS

EP         1 341 105 A1     9/2003

(Continued)

OTHER PUBLICATIONS

Per Kristian Gjermshus, Key management in distributed systems, University of OSLO Department of Informatics, Candidate Scientific Thesis, Aug. 2000, 133 pages.*

(Continued)

*Primary Examiner*—Calvin L Hewitt, II
*Assistant Examiner*—James D Nigh
(74) *Attorney, Agent, or Firm*—Locke Lord Bissell & Liddell

(57) ABSTRACT

A mobile terminal is equipped for SMS payment and service authentication with a remote transaction provider. The remote provider uses common secrets & a seed in a keyed Hash Machine Address Code (HMAC) executing a Message Digest Algorithm to generate a list of authentication token (user-name-password) for the purchase of services an/or goods. The common secrets and seed are shared with local redemption devices which also generate the list of authentication token. A subscriber conducts payment with the remote transaction provider and receives an authentication token corresponding to the purchased service. The subscriber provides the authentication token to the redemption device which compares the authentication token with sets of valid authentication tokens generated by the redemption terminal. If the comparison indicates a match, the redemption device provides the service to the subscriber.

53 Claims, 8 Drawing Sheets

U.S. PATENT DOCUMENTS

2003/0204721 A1*  10/2003  Barrus et al. ............... 713/153
2004/0073801 A1*  4/2004  Kalogridis et al. .......... 713/176

FOREIGN PATENT DOCUMENTS

| EP | 1 396 824 A2 | 3/2004 |
| WO | WO 02/063517 A2 | 8/2002 |
| WO | WO 2004006532 A1 * | 1/2004 |

OTHER PUBLICATIONS

International Search Report (Oct. 24, 2005).
SMS-based authentication system for the Commuu trial, Ekberg, Nov. 24, 2003 (6 pgs.).

* cited by examiner

Password construction in mobile & auth. server

TRANSACTION AND PAYMENT SYSTEM SECURITY REMOTE AUTHENTICATION/VALIDATION OF TRANSACTIONS FROM A TRANSACTION PROVIDER

BACKGROUND OF INVENTION

1. Field of Invention

The present invention relates to transaction and payment systems, methods and program products. More particularly, the invention relates to systems and methods for securing remote authentication/validation of transactions from a transaction provider for use in a local redemption device that does not have continuous connection with the remote transaction provider.

2. Description of Prior Art

Electronic payment systems for transportations are already in use today using the messaging service of a ubiquitous telecom network SMS (Short Messaging Service) to authenticate and pay for services in buses and trains, where the communication channel between the train/bus and a data network is not necessarily continuous. The most common technical obstacle that has to be overcome in transportation is that there is necessarily no continuous link between the server where consumption of the services is happening (in the train/bus) and the server that receives information that the short message transaction has been carried out (somewhere in the always-connected data network). The closest existing mechanism is the SMS—ticketing systems of public transportation, but even in that case the ticket checker presumably synchronizes his or her (checking) device periodically, and in those systems there is no need for personalization nor context management.

What is needed in the art is an e-services payment system which overcomes problems in the transportation payment art, as follows:

- The transportation server can reliably accept the result of an SMS payment even if the server does not have a network connection to any global infrastructure.
- The system can manage the case where payment is time-dependent. and a user changes transportation (from a bus to a train).
- The system can know when, and react to, a given user is repeatedly using the same service.
- The system can protect against fraud where users collude against the system ('I give you this password for half the price . . . ).

Prior art related to transportation payment systems and authentication/validation includes:

1. U.S. Pat. No. 6,386,451 entitled "Travel system and methods utilizing multi-application passport cards", issued May 14, 2002 discloses a travel system and methods that encompass a plurality of travel service providers and multi-application passport cards for the automated compilation, issuance, and utilization of the passport cards for said plurality of travel services, including the implementation of related application scenarios. The multi-application cards are realized by portable device technologies, such as, smart cards or pocket-sized computer devices, and have the ability to store and activate a traveler's permit for transportation and other passport services; as well as a monetary value for electronic payment means. Biometrics identification of cardholders, as well as cryptographic certification of card data and travel-related information, can optionally be encoded onto the cards and can be verified, including validated, at various point-of-service locations upon presentation of the card for utilization.

2. U.S. Pat. No. 5,887,266 entitled "Method for using applications in a mobile station, a mobile station and a system for effecting payments", issued Mar. 23, 1999 discloses a method for using an application in a mobile station. The application has a first mode of operation and a second mode of operation. The first mode of operation is passive. In the second mode of operation the application controls a master control unit (MCU) of the mobile station. Also provided is a system for making payments, comprising at least one mobile station which has an associated application, a component for using the application, and a first transceiver for providing local data transfer. The system also comprises at least one cash register or the like, which has a second transceiver for providing data transfer. The application has a capability for causing data to be transferred from the first transceiver to the second transceiver.

3. U.S. Pat. No. 6,615,262 entitled "Method and apparatus for remotely administered authentication and access control", issued Sep. 2, 2003 discloses authentication and session management can be used with a system architecture that partitions functionality between a human interface device (HID) and a computational service provider such as a server. An authentication manager executing on a server interacts with the HID to validate the user when the user connects to the system via the HID. The authentication manager interacts with authentication modules. Each authentication module may be configured to authenticate a user based on a different authentication mechanism (e.g., using a smart card, using a login and password, using biometric data, etc.) and may be utilized in connection with one or more sessions. The authentication manager and authentication modules are also responsible for controlling access to services/sessions and may remove/revoke or augment such access. A session manager executing on a server manages services running on computers providing computational services (e.g., programs) on behalf of the user. The session manager notifies each service in a session that the user is attached to the system using a given desktop machine. A service can direct display output to the HID while the user is attached to the system. When a user detaches from the system, each of the service's executing for the user is notified via the authentication manager and the session manager. Upon notification that the user is detached from the system, a service continues to execute while stopping its display to the desktop machine.

None of the prior art discloses a mobile terminal equipped for SMS payment and service authentication in a mobile environment with a remote payment and transaction provider (authentication server) wherein common secrets & a seed serve in an algorithm to generate a list of authentication pairs (username-password) for transactions. The common secrets and seed are shared with remote transaction provider and redemption devices (local servers) via a non-continuous communication link, wherein the seed is periodically updated. A subscriber conducts payment with the authentication server and receives an authentication pair in a token or ticket corresponding to the purchased service, the authentication token being generated by the authentication server based on the common secrets and current value of the seed. Upon service redemption, the subscriber provides the authentication token to the local server which compares the authentication token with sets of valid authentication token generated by the local server based on the common secrets and current value of the seed provided by the remote transaction provider. If the comparison indicates a match, the local server provides the service to the subscriber and makes a log record of the transaction.

SUMMARY OF THE INVENTION

In one embodiment, the present invention is applicable in a transportation environment enabling users to purchase local train/bus service from a remote transaction provider. Each user carries a portable terminal, typically a GSM mobile phone enabled for Short Message Service (SMS). The user using SMS messaging can electronically interact with the remote transaction provider via a wireless wide area network (WWAN) or through a local connection, if the transaction provider is represented in a local environment. The remote transaction provider or authentication server stores two (2) secret keys (s1) and (s2) and a seed (x) assigned to a specific future date. Each date is divided into time periods and each time period is assigned a seed $x_{d,\,p}$, where (d) is a future date and (p) is a time period. The time is taken into account especially in connection with services that are valid for a limited time period. For each time period, a list of username (u)-password (p) pairs ($u^i_{d,p}, p^i_{d,p}$) are generated. The user will be identified by the user's phone number and tied to a given temporary username and password which form an authentication token. The authentication server upon receiving the user SMS request, returns an authentication token and logs the user's phone number, time and returned authentication token. Previously, the authentication server provided local redemption servers with the seed and the common secrets via a non-continuous communication link, and periodically updates the seed, common secrets and current time. Using the seed, common secrets and current time, the redemption servers calculate a list of authorized authentication token. When the user enters the token into the local redemption server, the local server will check the correctness of the token by comparing it to all possible authentication token for the given time period. If the token is found in the set of possible tokens, the local server will accept the token and tie the media access control (MAC) hardware address of the user device to the authenticated token. Otherwise, the token is rejected and the local server rejects service for the user.

An aspect of the invention is an electronic payment system securing authentication/validation of transactions remotely from a transaction provider for use in a local redemption device that does not have continuous connection with the remote transaction provider.

Another aspect is a mechanism allowing a local redemption device to confirm validity of a transaction token/ticket even in the cases where there is no connection available to a remote transaction provider.

Another aspect is a user interacting with a remote authentication server to obtain authenticated tokens for local transportation service after validation of the token by a local server.

Another aspect is a time based token for transportation service generated by recursively applying a keyed hash message authentication code (HMAC) to an authentication pair.

DESCRIPTION OF PREFERRED EMBODIMENT

As an overview, the present invention is designed to be applicable especially in connection with public transportation systems, wherein the subscribers may purchase tokens or ticket(s) for services from a remote service provider by sending a request for a ticket via a wide area network, e.g. using SMS. The remote service provider can charge the subscribers e.g. by way of adding the value of the ticket to subscriber's phone bill. In an alternative embodiment the subscribers may buy the tickets locally from a dedicated purchase place through local area connection. In any case, after necessary payment procedures are completed, the subscriber is provided with a ticket authenticated for acceptance by a local server for transportation services after validation. In an alternative embodiment, the object of the purchase may be e.g. a token representing an amount of money that the subscriber is allowed to use for a certain services (e.g. pre-paid systems).

Figure 1:
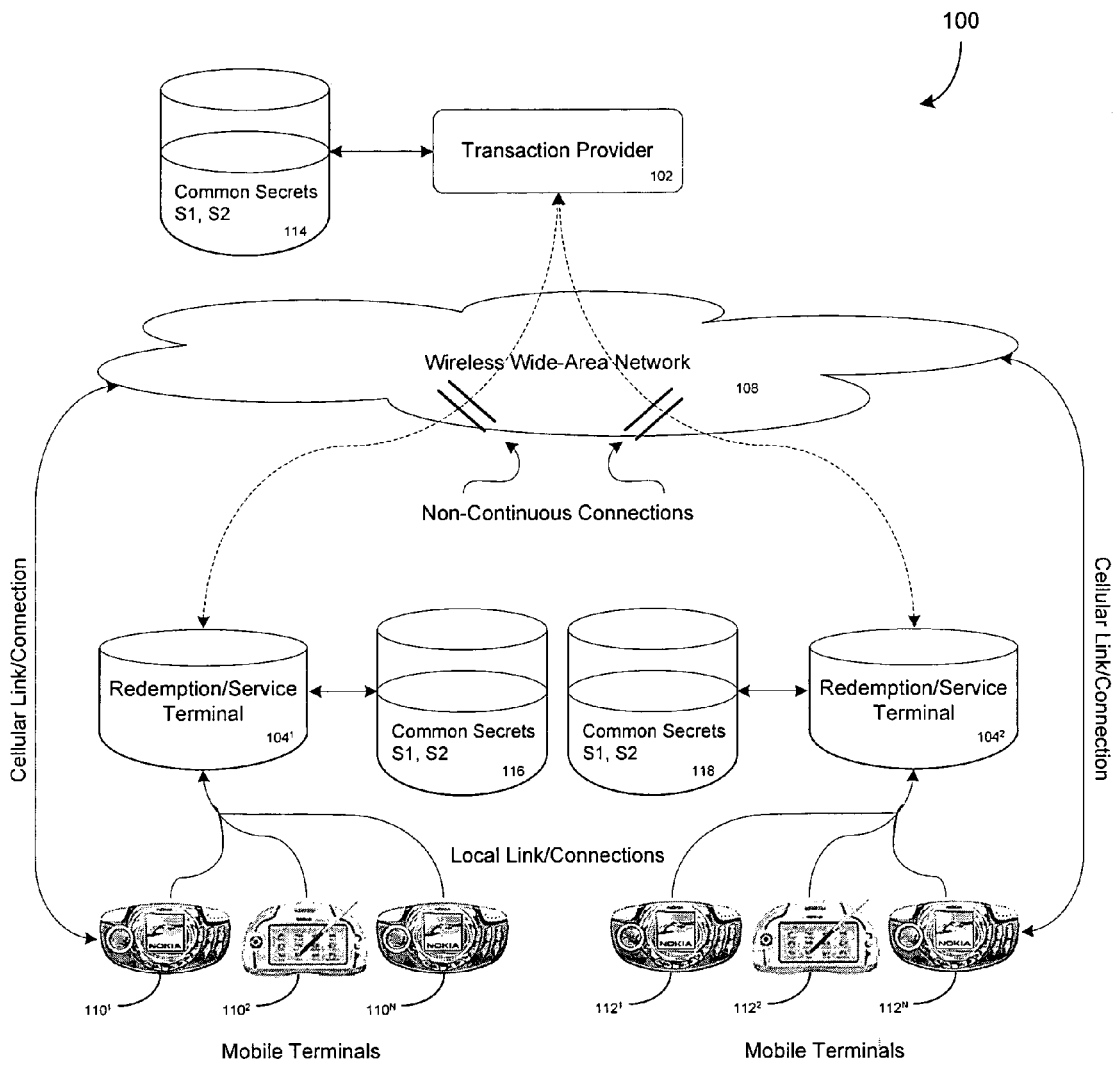
FIG. 1 is a representation a mobile terminal interacting with a remote transaction provider to obtain authenticated token(s) for acceptance/rejection by a local server providing user services wherein the local server is in non-continuous contact with the transaction provider and the transaction provider and local server generate a list of authenticated tokens from common secrets and a seed provided by the remote transaction provider used for authorizing or rejecting service for the user according to an embodiment of the present invention.

In FIG. 1, a transaction and payment system 100, according to an embodiment of the present invention includes a transaction provider (authentication server) 102 linked to redemption/service terminals (local server) $104^1$, $104^2$ via non-continuous wireless connections $106^1$ and $106^2$, respectively$^{through}$ a wireless wide—area network 108. The connection may be secure and mutually authenticated. The local servers may be stationary at a train station or mobile when installed in a vehicle. A plurality of mobile terminals interacts with the local servers $104^1$ and $104^2$ to obtain transportation services. For purposes of illustration, mobile terminals $110^1$, $110^2$ and $110^N$ interact with server $104^1$ and mobile terminals $112^1$, $112^2$ and $112^N$ interact with server $104^2$ for obtaining goods or services, after payment to the transaction provider 102 and validation of a token or ticket for service issued by the provider 102. It should be understood, however, that any mobile terminal is free to interact with any local server, wherever, for obtaining services. The mobile terminal is SMS enabled and the subscriber/user is assumed to have a working knowledge regarding how to use short messages. A SMS telephone system is described in U.S. Pat. No. 6,665,531 assigned to the assignee of the present invention and fully incorporated herein by reference.

The transaction provider 102 (Authentication server) is a conventional server linked to the network 108 and including storage 114, typically non-volatile, for storing programs and processes interacting with the mobile terminals for payment of services and executing algorithms in an authentication system for issuing tickets/tokens for the services requested by the subscribers. The authentication system uses keyed message digests for providing security. In one embodiment, keyed Hashing for Message Authentication Codes (HMAC) is used with a cryptographic hash function, typically MD5. HMAC is described in IETF RFC 2104 and MD5 is described in IETF RFC 1321. HMAC requires a secret key for the calculation and verification of the message authentication values. To this end, keys ($s_1$) and ($s_2$), e.g. 128 bit random strings are stored in the storage device 114 along with a similarly constructed seed (x) that serves as the base for the authentication value generation (ticket/token) during a designated time-period.

The redemption/service terminals 104$^1$ and 104$^2$ (local servers) also include storage units 116 and 118, respectively storing programs for processing and validating tickets/tokens presented for services by the subscribers. The common secret keys ($s_1$) and ($s_2$) and seed (x) are supplied by the server 102 to servers 104$^1$ and 104$^2$ on an intermittent basis due to the non-continuous connection between the server 102 and the server 104. The communication of the secrets and seed must be done over a protected channel, or alternatively the transmission of the configuration data must be encrypted and integrity protected for the duration of the transfer. The shared secrets and seed are used by the servers 104$^1$ and 104$^2$ to calculate lists of authentication tokens, and validating/rejecting the subscriber ticket/token for services, as will be explained hereinafter. The authentication may take a form or authentication token according to one embodiment of the present invention, but that is just one embodiment for the present invention. . . . The seed can be considered to represent a security context for a given time period. Seeds for future time periods can be transmitted to servers 104 ahead of time. More importantly, the seed provides enough randomness to prevent outsiders from hacking the hash codes and misusing the hacked authentication token. The seed can be valid for various time periods e.g. one day. However, in the case of public transportation, a single ticket may be valid for limited time periods, e.g. 2 hours. If further security is required, the validity time period of the seed may be divided into several sub-timing periods, each having separate authentication tokens calculated on the order number or time period of the sub timing period, and to be described further in connection with FIG. 2A.

Figure 2:
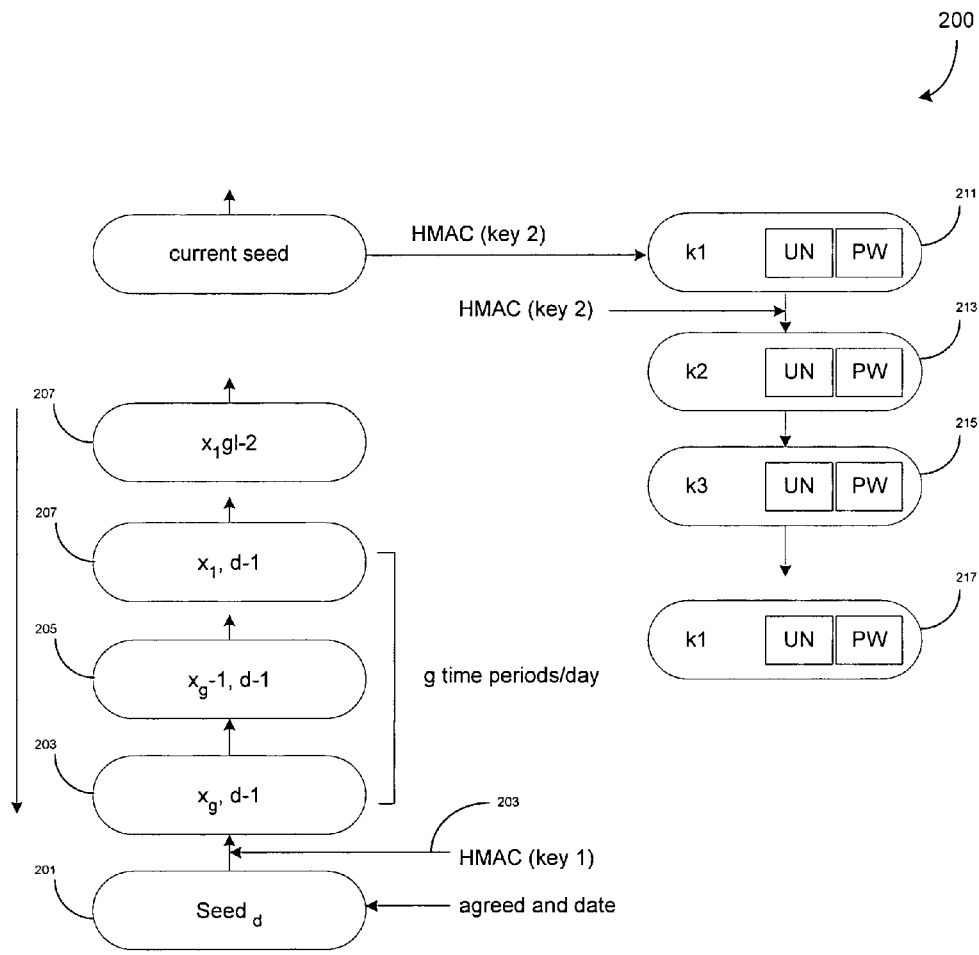
FIG. 2 is an exemplary algorithm according to an embodiment of the present invention for the construction of a username-password (UN/PW) from the common secrets and seed used in generating tokens for use in the system of FIG. 1.

FIG. 2 describes an algorithm 200 for constructing username (UN) and password (PW) pairs for the authentication and local servers according to an embodiment of the present invention. In step 201, a seed (d) is assigned a specific date and in step 203 combined with secret key ($s_1$) in a HMAC process. Each day is divided into equal time periods in steps 203, 205 and 207 and each time period is assigned a seed $x_{d,p'}$ calculated in step 209 as a reverse (keyed) hash chain over the time periods (1), i.e. $x_{d,p'}(1) = HMAC(s_1, x(l-1))^{1/l}$ from the expression:

$$l = (y-d) \times g + (g-p)$$

Where:
l=remaining time periods.
y=a specific date in the future.
p=time period.
d=date of time period
g=time periods in day.

For each time period a number n (currently n=1000) of username-passwords pairs $u^i_{d,p}, p^i_{d,p}$ are generated again in step 211 by recursively applying the keyed HMAC function,= $u^i_{d,p}, p^i_{d,p} = HMAC(S_2, X_{D,P})^I$ in steps 213-217. The user will be determined by the user's phone number and tied to a given temporary username and password only through logs, so actually the username and password together form an authentication token.

Figure 2A:
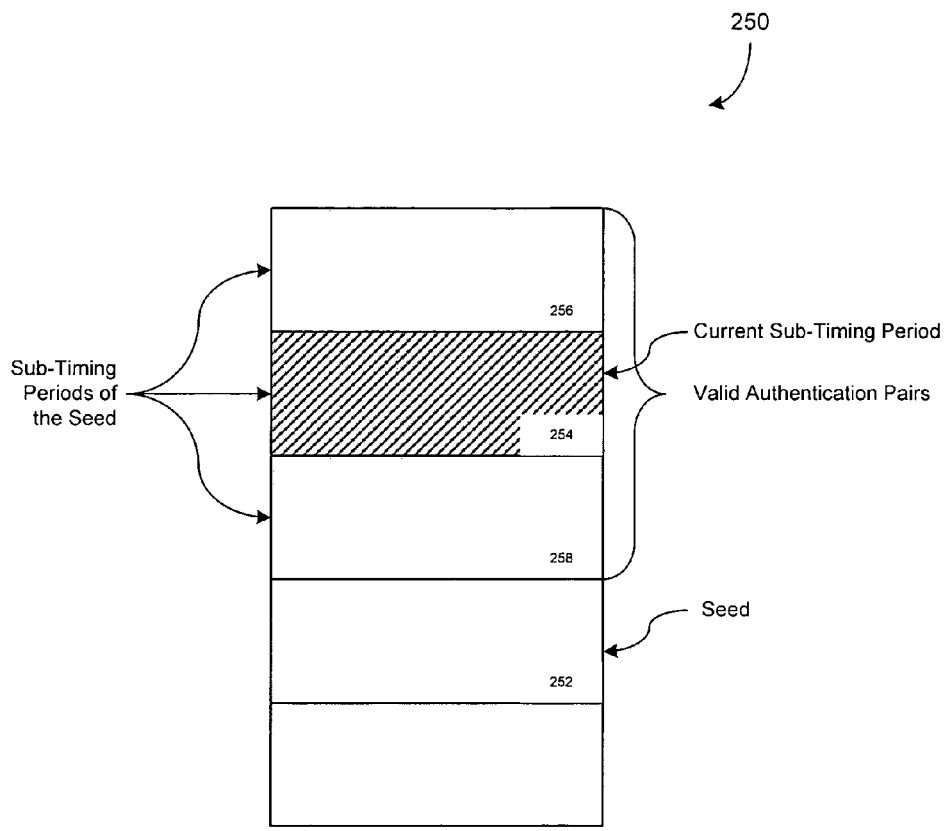
FIG. 2A is a representation of time periods for a seed used in the algorithm of FIG. 2 in generating a username-password according to an embodiment of the present invention.

The redemption/service device 104 upon calculating the sub-timing periods 250 of a seed 252, as shown in FIG. 2A, maintains a predefined set of the authentication tokens in a valid authentication token list. According to one embodiment of the present invention, the valid list includes the authentication token of the current sub-timing period 254 and one sub-timing period before 256 and after 258 said sub-timing period in order to ensure the correct validity period for the tickets. This can of course be adjusted based on the needs of the current application.

Figure 3:
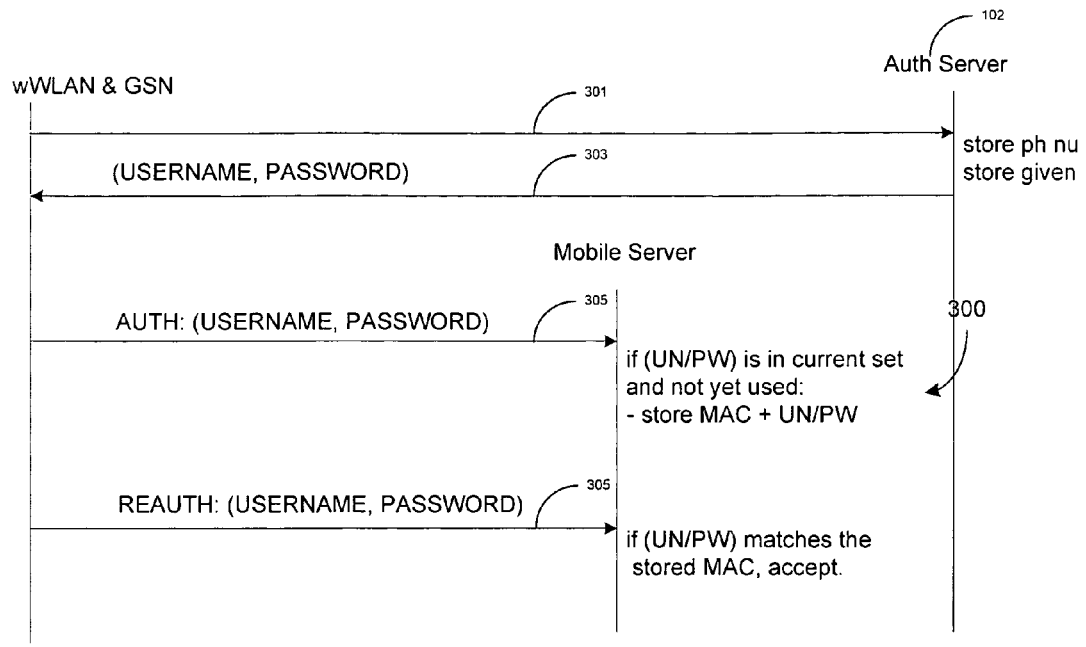
FIG. 3 is a signaling diagram between the user and the remote transaction provider and local server in FIG. 1 for obtaining and using an authorized token for service under the control of the local server according to an embodiment of the present invention.
Figure 4:
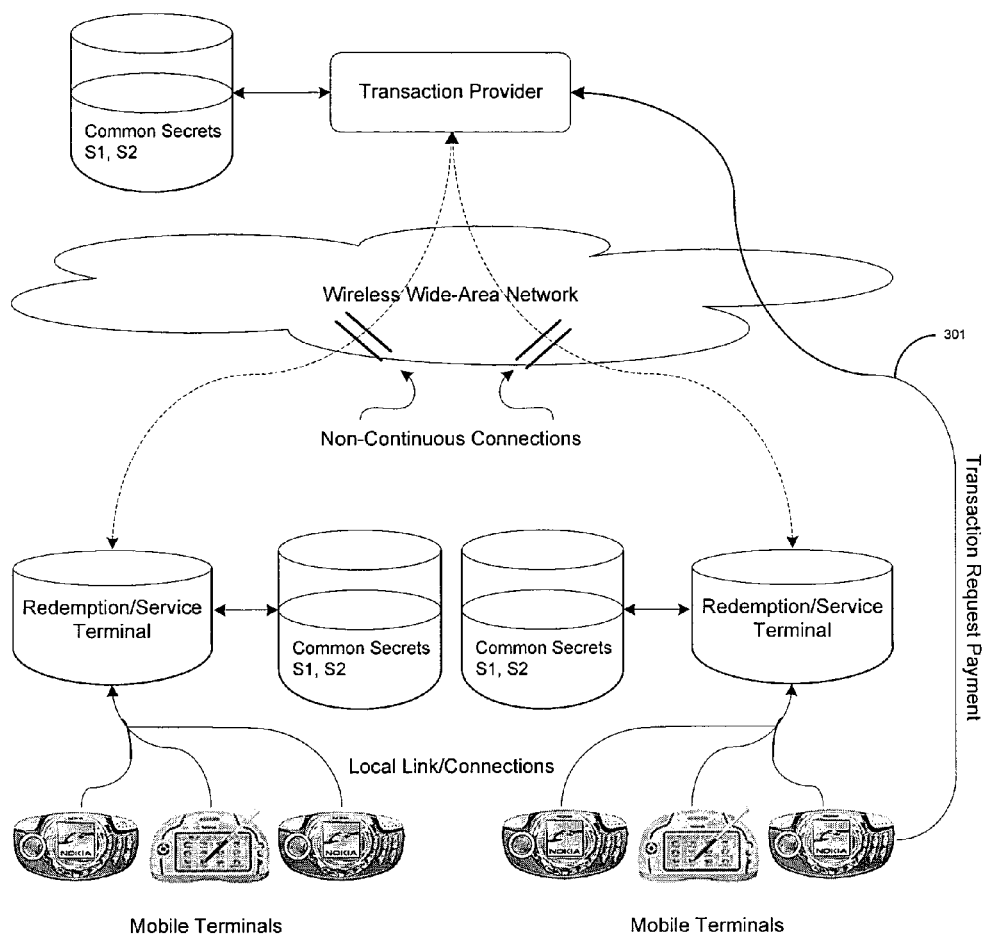
FIG. 4 is a representation of the state of FIG. 1 for a user making a transaction request/payment according to an embodiment of the present invention.
Figure 5:
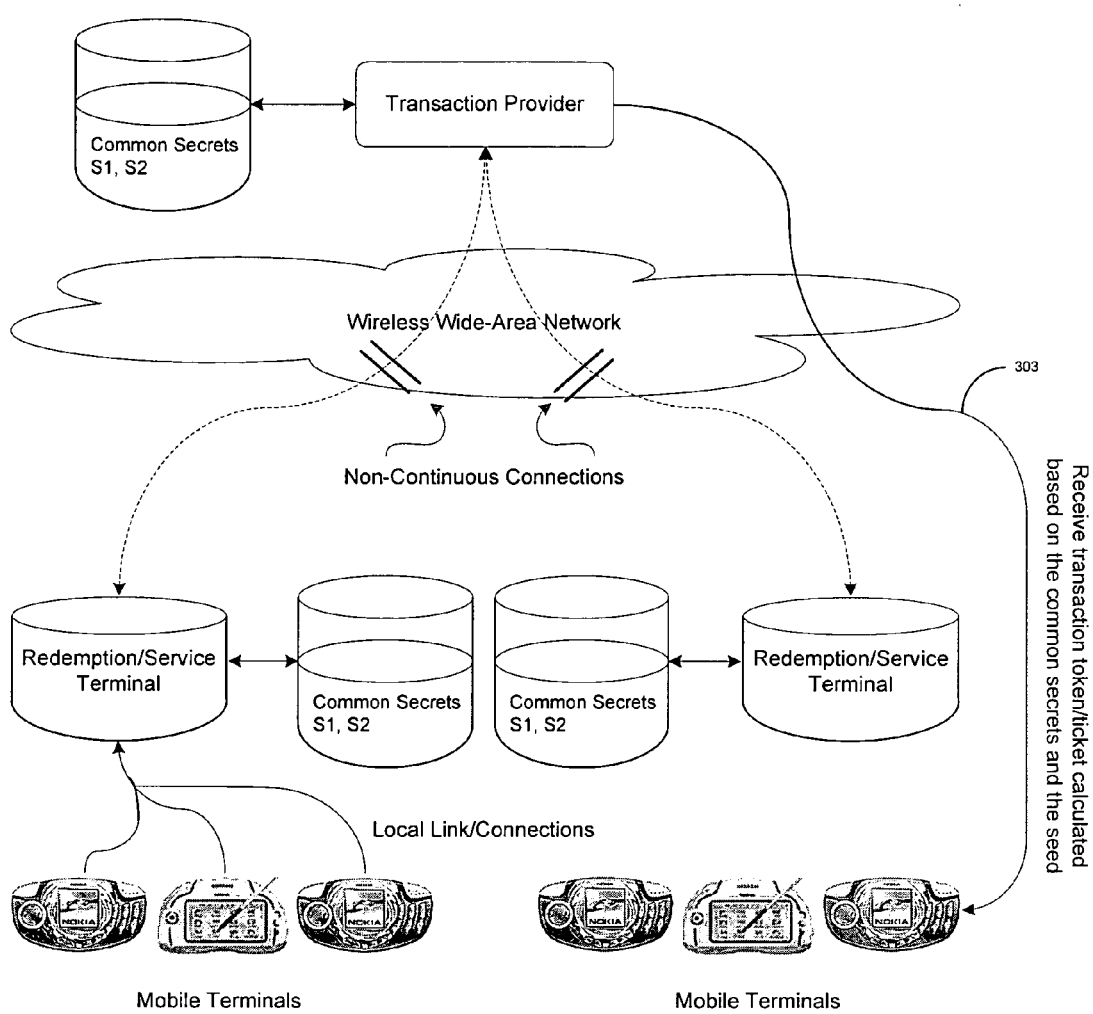
FIG. 5 is a representation of the state of FIG. 1 for a user receiving a transaction token calculated by the transaction provider from the common secrets and seed according to an embodiment of the present invention

FIG. 3 taken in conjunction with FIGS. 4-7 discloses a signaling process 300 between the subscriber and the authentication server 102 and the local server 104 for acquiring services according to an embodiment of the present invention. The process is started by the user sending the server 102 a request and payment for service message 301 via a cellular link/connection using an SMS enabled phone (FIG. 4). The server 102, upon receiving the SMS, will return an authentication token, and log the user's phone number, time and the returned authentication token in a message 303 (FIG. 5). The authentication tokens are given out in random order from the set of n tokens generated for the current date and time period (d, p). A given token is given out only once. The token of bit length (x) (currently x=32, is presented to the user as two 4-character hex strings, one as a user name and one as a password). The user name and password strings should be user friendly in the sense that an ordinary user should he able to look at the string in the phone display, memorize it, and type it in one setting. Even though the two strings currently contain only 32 bits of randomness, improved versions with a larger character space or longer strings can be taken into use without significant changes in the system. The user name-password pairs can, especially if their length is increased, be mapped into plaintext strings (using a dictionary) to make it easier for the user to memorize and enter the authentication token/ticket.

The user, when connected to the server 104, is given instructions to type in an authentication token (username-password) and returns the information in a message 305. The user may not be aware of the actual data to be transmitted and provided only with e.g. a graphical indication of the ticket that does not reveal the actual authentication pair. Instead of typing the authentication pair, a Bluetooth or RFID connection to the server 104 may be used to transfer an authentication token to the server 104, as will be described in FIG. 3A hereinafter.

Figure 7:
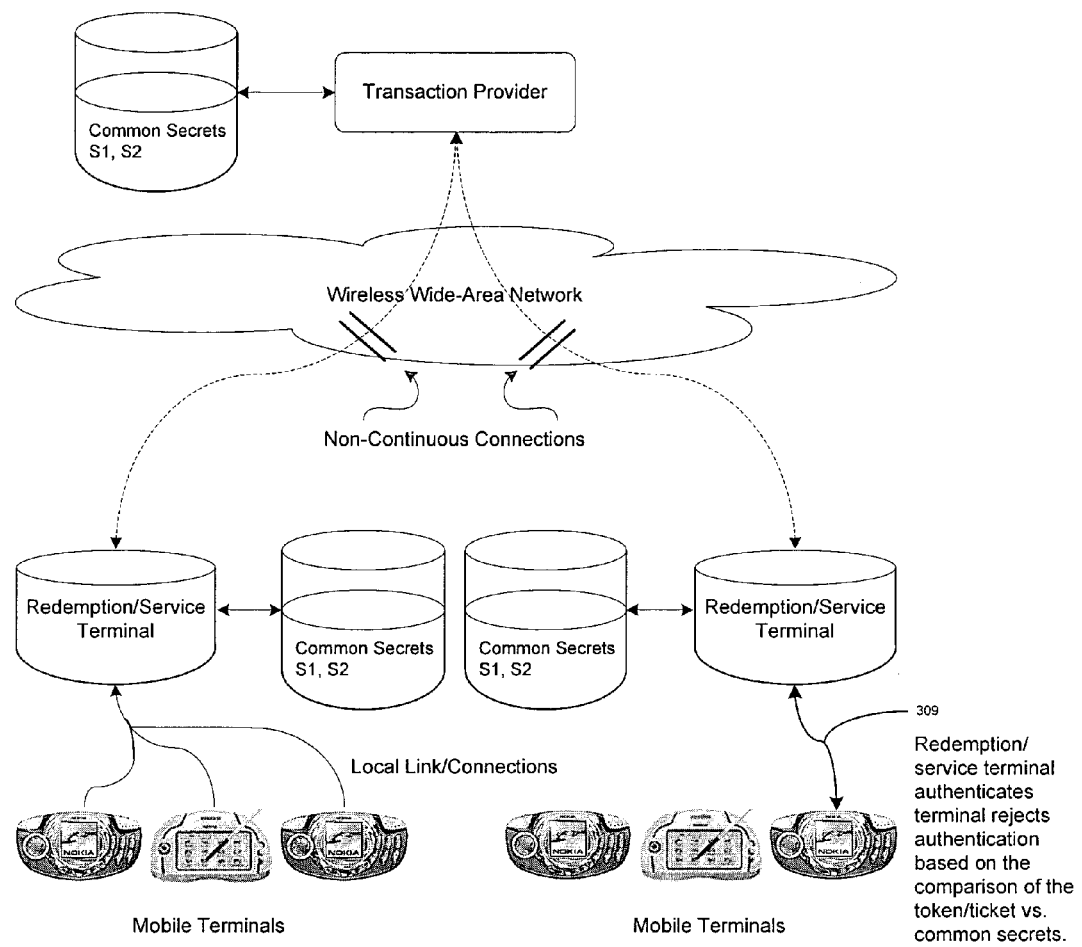
FIG. 7 is a representation of the state of FIG. 1 for the local server accepting/rejecting the token for service according to an embodiment of the present invention.

When the user enters the authentication token into the mobile server via message 305 the server will check the correctness of the token by comparing to all possible tokens $$\forall_{i \not\subset (0...n-1)} \forall_{c \not\subset (l-r...l+r)} u_c^i, p_c^i$$

where 1 is the time period defined by d, p, and r is a factor providing authentication token period overlap compensating an assumed synchronization mismatch between local server and authentication server clocks, where r is currently 1. If the token is found in the set of possible tokens and not used yet, the mobile server will accept the login, and tie the MAC hardware address of the user device (as seen by the mobile server) to the given authentication token. (FIG. 7). A re-authentication operation with a previously accepted authentication token will only be accepted by the redemption local server via a message 307, if the MAC address has not changed between authentication attempts.

Alternatively, the user may be requested to feed in an existing authentication token or request a new one with an SMS message to the authentication server 102 at a given SMS number. When the user is presented with the phone number to send his password request to the server 102, he/she may be requested to input a local server identifier in the SMS message. In such a case, the seed and secret keys may be different for each local server. Furthermore, a password acquired in one local server would not be unconditionally accepted in another when the user switches trains. However, this inconvenience my be remedied in several ways, the easiest being to enlarge the authentication token space; allocate given sets to different local servers, and provide some extra checking if a user "boards" a local server with a token belonging to some other local server. Alternatively, a more elaborate and user friendly protocol can be constructed with a client entity in the user terminal, which gets input from the local server and communicates with the authentication server using the phone as a SMS modem. The solution is OS independent with respect to the client terminal.

All unsuccessful, as well as successful login attempts are logged, containing the authentication token, time and the perceived MAC address of the user device making the login attempt. In order to prevent possible misuse the usage information of authentication tokens are collected at the local server and merged with the user/terminal identification information related to token purchase. The collected "log" information is then transmitted to periodically to the remote server. If inappropriate usage of tokens is detected, the remote server can provide an alarm containing the user identification and the way the token was misused in order to expel the users behind the misuse.

Figure 3A:
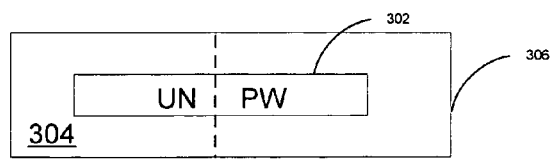
FIG. 3A is a representation of an electronic ticket for use in the system of FIG. 3.
Figure 6:
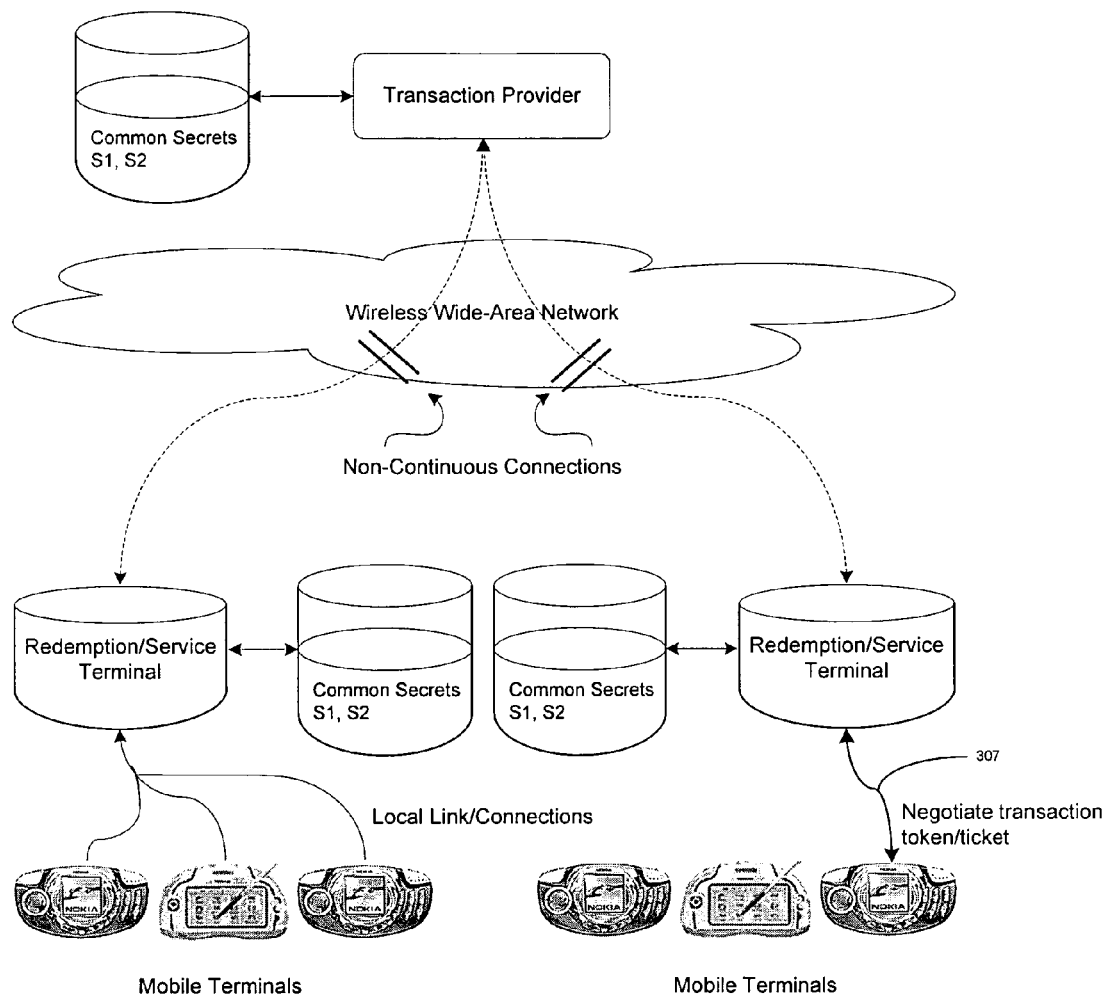
FIG. 6 is a representation of the state of FIG. 1 for a user negotiating a transaction token/ticket with the local server for service according to an embodiment of the present invention.

In an alternative embodiment, as shown in FIG. 3A, an authentication token 302 is embedded in an electronic ticket 304 of a data frame 306, upon purchase, e.g. through SMS. The ticket is sent to the user and stored in a passive RFID device (not shown) included in the user's mobile device. The ticket is not shown to the user at all. The user may be provided additional information in a message accompanying the ticket, e.g. "One-Day Bus ticket. ID No. 11234XYX123. Please provide the ticket to the redemption machine when entering". . . . The actual authentication data (authentication pair) is hidden within the ticket. When the ticket is activated in the mobile phone upon entering, e.g. a bus, the redemption device sends an RFID interrogation signal 307 (FIG. 6). The user's mobile device responds to the signal 307 and sends a RFID response 309 (FIG. 7), including at least the authentication token information and preferably the mobile terminal identification. The redemption device validates the token information by comparing to the valid token list previously calculated by the redemption device from common secret keys and seed, as described in connection with FIG. 2A. After validation, the purchased services are made available to the user.

While the invention has been described in a preferred embodiment, various changes can be made therein without departing from the spirit and scope of the invention as defined in the appended claims, in which:

I claim:

1. A method, comprising:
    generating in a remote server and in an at least one local server a list of valid authentication tokens based on secret keys shared between the remote server and the at least one local server and a seed with an authentication algorithm;
    requesting, by a mobile terminal, a transaction token from the remote server;
    selecting, by the remote server, an authentication token from the list of valid authentication tokens in the remote server;
    purchasing, by the mobile terminal, the selected authentication token;
    transmitting the purchased authentication token to the mobile terminal;
    receiving, by the at least one local server, the purchased authentication token;
    comparing by the at least one local server the purchased authentication token to the list of valid authentication tokens in the at least one local server;
    authenticating the purchased token by determining, by the local server, that the purchased token matches an authentication token in the list of valid authentication tokens in the at least one local server; and
    based on the determination that the received token is valid, accepting, by the at least one local server, the purchased token.

2. The method of claim 1, wherein the list of valid authentication tokens are periodically updated.

3. The method of claim 2, wherein the list of valid tokens are periodically updated by changing at least the seed specify a date and time period for the authentication algorithm.

4. The method of claim 1 further comprising; installing a communication connection between the remote and the at least one local servers which is non-continuous in operation.

5. The method of claim 4, wherein the non-continuous communication connection is used for transferring from the remote server one or more seed updates to the at least one local servers.

6. The method of claim 1, further comprising:
    requesting, by the local server, mobile user identification information from the mobile terminal in exchange of providing the services and/or good to the mobile terminal.

7. The method of claim 1, wherein the non-continuous communication connection is used for transferring from the at least one local servers to the remote server information relating to authentication token usage.

8. The method of claim 7, wherein the authentication token usage includes at least one of a mobile terminal identification information and mobile terminal user identification information.

9. The method of claim 4, wherein the non-continuous communication connection is secure.

10. The method of claim 1, further comprising:
installing the authentication token into an electronic ticket.

11. The method of claim 1, further comprising:
authenticating the authentication token using RFID.

12. The method of claim 1, further comprising;
generating the list of authentication tokens by recursively applying a keyed HMAC function to the common keys and seed.

13. The method of claim 1, further comprising:
modifying the authentication tokens via the seed to be time based.

14. The method of claim 1, further comprising:
updating the common secret keys and seed in the remote server and the local server.

15. The method of claim 1, further comprising:
using SMS messaging in submitting the request to the remote server.

16. The method of claim 1, further comprising:
using short range communication to transfer the authentication token to the local server.

17. The method of claim 1, further comprising:
limiting validity of the authentication token to a time period.

18. The method of claim 1, further comprising:
tying an accepted authentication token to a MAC hardware address of a requester.

19. The method of claim 17, further comprising:
dividing the time period into several sub-timing periods.

20. The method of claim 19, further comprising: assigning separate authentication tokens to each sub-timing period.

21. The method of claim 20, further comprising: calculating the separate authentication token for sub-timing periods based on the order number or the time-period of the sub-timing period.

22. The method of claim 1, wherein the list of valid authentication tokens includes tokens for a current sub-timing period and tokens for a sub-timing period before and a sub-timing period after the current time period to ensure the correct validity period for the token/ticket.

23. The method of claim 1, wherein the seed is assigned a date (d) in the future.

24. The method of claim 23, wherein the seed is further assigned a time period (p).

25. The method of claim 1, wherein the tokens are given out by the remote server in random order for single use.

26. The method of claim 1, wherein the token contains two-4-character hex strings, one as a username and one as a password.

27. The method of claim 1, wherein the local server compares a token to all possible tokens in time period (1) defined by a date (d); a period (p) and (r) a factor providing authentication periods overlap compensating for an assumed synchronization mismatch between the local server and the remote server clocks.

28. A system, comprising:
a remote server comprising:
a processor; and
a memory comprised of computer readable instructions, when executed by the processor cause the processor to perform the steps of:
generating in the remote server a list of valid authentication tokens based on secret keys and a seed with an authentication algorithm; and
transmitting a purchased authentication token to a mobile terminal;
at least one local server comprising:
a processor; and
a memory comprised of computer readable instructions, when executed by the processor cause the processor to perform the steps of:
generating in the at least one local server a list of valid authentication tokens based on said secret keys shared between the remote server and the at least one local server and said seed with said authentication algorithm;
receiving, by the at least one local server, the purchased authentication token;
comparing by the at least one local server the purchased authentication token to the list of valid authentication tokens in the at least one local server;
authenticating the purchased token by determining, by the local server, that the purchased token matches an authentication token in the list of valid authentication tokens in the at least one local server; and
based on the determination that the received token is valid, accepting, by the at least one local server, the purchased token;
the mobile terminal comprising:
a processor; and
a memory comprised of computer readable instructions, when executed by the processor cause the processor to perform the steps of:
requesting, by the mobile terminal, a transaction token from the remote server; and
purchasing, by the mobile terminal, the selected authentication token.

29. The system of claim 28, wherein the list of valid authentication tokens are periodically updated.

30. The system of claim 29, wherein the list of valid tokens are periodically updated by changing at least the seed specifying a future date for the authentication algorithm.

31. The system of claim 28, further comprising:
installing means for installing a communication connection between the remote and the at least one local servers which is non-continuous in operation.

32. The system of claim 31, wherein the non-continuous communication connection is used for transferring from the remote server one or more seed updates to the at least one local servers.

33. The method of claim 28, further comprising:
said at least one local server configured to request mobile user identification information from the mobile terminal in exchange of providing the services and/or the goods to the mobile terminal.

34. The system of claim 28, wherein the non-continuous communication connection is used for transferring from the at least one local servers to the remote server information relating to authentication token usage.

35. The system of claim 34, wherein the authentication token usage includes at least one of a mobile terminal identification information and mobile terminal user identification information.

36. The system of claim 31, wherein the non-continuous communication connection is secure.

37. The system of claim 28, wherein the authentication token is installed in a ticket.

38. The system of claim 28, wherein the generating means generates the list of authentication tokens by recursively applying a keyed HMAC function to the common keys and seed.

39. The system of claim 28, further comprising:
modifying means modifying the authentication token via the seed to be time based.

40. The system of claim 28, further comprising:
updating means updating the common secret keys and seed in the remote server and the local server.

41. The system of claim 28, further comprising:
terminal means enabled for submitting the SMS request to the remote server.

42. The system of claim 28, further comprising:
terminal means enabled for short range communication to transfer the authentication token to the local server.

43. The system of claim 28, further comprising:
limiting means limiting validity of the authentication token to a time period.

44. The system of claim 28, further comprising:
tying means tying an accepted authentication token to a MAC hardware address of a requester.

45. The system of claim 43, further comprising:
dividing means dividing the time period into several sub-timing periods.

46. The system of claim 45, further comprising:
assigning means assigning separate authentication tokens to each sub-timing period.

47. The system of claim 45, further comprising:
calculating means calculating the separate authentication token for sub-timing periods based on the order number or the time-period of the sub-timing period.

48. The system of claim 28, wherein the list of valid authentication tokens includes tokens for a current sub-timing period and tokens for a sub-timing period before and a sub-timing period after the current time period to ensure the correct validity period for the token/ticket.

49. The system of claim 28, wherein the seed is assigned a date (d) in the future.

50. The system of claim 49, wherein the seed is further assigned a time period (p).

51. The system of claim 29, wherein the tokens are given out by the remote server in random order for single use.

52. The system of claim 28, wherein the token contains two-4-character hex strings, one as a username an one as a password.

53. The system of claim 28, wherein the local server compares a token to all possible tokens in time period (1) defined by a date (d); a period (p) and (r) a factor providing authentication period over lap compensating for an assumed synchronization mismatch between the local server and the remote server clocks.

* * * * *

UNITED STATES PATENT AND TRADEMARK OFFICE
CERTIFICATE OF CORRECTION

PATENT NO. : 7,693,797 B2  Page 1 of 1
APPLICATION NO. : 10/871051
DATED : April 6, 2010
INVENTOR(S) : Ekberg It is certified that error appears in the above-identified patent and that said Letters Patent is hereby corrected as shown below:

On the Cover Page

In Section (54), "TRANSACTION AND PAYMENT SYSTEM SECURITY REMOTE AUTHENTICATION/VALIDATION OF TRANSACTIONS FROM A TRANSACTION PROVIDER" should read --TRANSACTION AND PAYMENT SYSTEM SECURING REMOTE AUTHENTICATION/VALIDATION OF TRANSACTIONS FROM A TRANSACTION PROVIDER--;

In Column 9

Line 58 (claim 28), "a memory comprised of computer readable", should read --a memory comprising computer readable--;

In Column 10

Line 1 (claim 28), "a memory comprised of computer readable", should read --a memory comprising computer readable--;

Line 23 (claim 28), "a memory comprised of computer readable", should read --a memory comprising computer readable--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,693,797 B2  Page 1 of 1
APPLICATION NO. : 10/871051
DATED : April 6, 2010
INVENTOR(S) : Ekberg It is certified that error appears in the above-identified patent and that said Letters Patent is hereby corrected as shown below:

On the Cover Page, Item (54) and at Column 1, lines 1-5, the title

"TRANSACTION AND PAYMENT SYSTEM SECURITY REMOTE AUTHENTICATION/VALIDATION OF TRANSACTIONS FROM A TRANSACTION PROVIDER" should read --TRANSACTION AND PAYMENT SYSTEM SECURING REMOTE AUTHENTICATION/VALIDATION OF TRANSACTIONS FROM A TRANSACTION PROVIDER--;

In Column 9

Line 58 (claim 28), "a memory comprised of computer readable", should read --a memory comprising computer readable--;

In Column 10

Line 1 (claim 28), "a memory comprised of computer readable", should read --a memory comprising computer readable--;

Line 23 (claim 28), "a memory comprised of computer readable", should read --a memory comprising computer readable--.

This certificate supersedes the Certificate of Correction issued July 20, 2010.

Signed and Sealed this

Seventeenth Day of August, 2010

David J. Kappos
*Director of the United States Patent and Trademark Office*